(12) United States Patent
Figge et al.

(10) Patent No.: US 6,200,664 B1
(45) Date of Patent: Mar. 13, 2001

(54) EXPLOSION BARRIER

(76) Inventors: Ward Figge, 14131 Morrison Ct., Dale City, VA (US) 22193; John Crawford, 282 Old Topanga Canyon Rd., Topanga, CA (US) 90290

(*) Notice: Subject to any disclaimer, the term of this patent is extended or adjusted under 35 U.S.C. 154(b) by 0 days.

(21) Appl. No.: 09/431,083

(22) Filed: Nov. 1, 1999

(51) Int. Cl.[7] ............................... B32B 1/00; F41H 5/02; F42D 5/00
(52) U.S. Cl. ....................... 428/178; 428/72; 428/117; 428/213; 428/920; 181/288; 181/290; 89/36.02; 102/303; 52/793.1
(58) Field of Search ............................. 428/72, 117, 137, 428/178, 213, 94, 920, 921; 181/288, 290, 292, 295; 169/26; 102/303; 89/36.02; 86/50; 52/193.1

(56) References Cited

U.S. PATENT DOCUMENTS

| | | |
|---|---|---|
| 3,011,602 | * 12/1961 | Ensrud et al. .................... 428/178 |
| 3,013,641 | 12/1961 | Compton . |
| 3,876,492 | 4/1975 | Schott . |
| 3,969,563 | 7/1976 | Hollis, Sr. . |
| 4,251,579 | 2/1981 | Lee et al. . |
| 4,348,442 | 9/1982 | Figge . |
| 5,122,213 | 6/1992 | Figge, Sr. . |
| 5,124,196 | 6/1992 | Figge, Sr. . |
| 5,394,786 | 3/1995 | Gettle et al. . |
| 5,435,226 | 7/1995 | McQuilkin . |
| 5,532,039 | 7/1996 | Payne et al. . |

* cited by examiner

Primary Examiner—Donald Loney
(74) Attorney, Agent, or Firm—Nixon & Vanderhye

(57) ABSTRACT

A barrier for containing an explosion in a room or the like. The barrier is a structural panel comprising a base sheet, a plurality of truncated polyhedral elements secured to and projecting from the base sheet, and a face sheet covering and secured to the truncated apexes of the polyhedral elements. The face sheet is constructed to separate from the polyhedral elements to expose them in the event of an explosion. Each polyhedral element is constructed to collapse in the event of an explosion, is filled with a liquid, and has an opening therein that is closed by a closure device that is openable or removable in response to the collapse of the polyhedral element caused by an explosion. The openings in the polyhedral elements are of a size to effect a misting action of the liquid therein when it is ejected from the openings by the collapse of the polyhedral elements caused by the explosion. The liquid mist serves to absorb and dissipate the heat and energy of the explosion.

7 Claims, 3 Drawing Sheets

EXPLOSION BARRIER

BACKGROUND OF THE INVENTION

The present invention relates generally to an explosion barrier and, more particularly, to such a barrier for enclosing a room or the like and absorbing or dissipating significant amounts of energy from an explosion in the room to prevent damage to surrounding rooms and personnel in the same building.

Terrorist bomb attacks provide a demonstrable need for increased protection for building occupants from the debris hazards generated by the blast. Loss of life in such attacks is caused mainly by the debris hazard generated by the blast. A small terrorist bomb, for example, detonated in a confined area, such as an office mail room or the like, can cause extensive damage to the surrounding rooms and personnel. Recent blast tests have demonstrated difficulty in minimizing or containing the damage caused, for example, by a one pound bomb in a 20×20 foot room typical of a mail room or the like.

Accordingly, there is a pressing need for a low cost, simple, non-intrusive room retrofit or barrier that will prevent damage to adjacent rooms and personnel in a building in the event of an explosion in a room. The explosion barrier of the present invention fills this need and is not subject to any of the disadvantages of previously used systems for containing explosions which have been expensive, difficult or complicated to install and have not served to adequately contain an explosion in a room or the like.

SUMMARY OF THE INVENTION

The explosion barrier of the present invention is a structural panel similar to those disclosed in U.S. Pat. No. 4,348,442, the disclosure of which is incorporated herein by reference.

The structural panel of the present invention may be used as the wall, ceiling and floor of a room to be contained, or may be installed as an inner layer on the existing walls, ceiling and floor of the room. The structural panel generally comprises a base sheet, a plurality of truncated polyhedral elements projecting from the base sheet, and a face sheet secured to the truncated apexes of the polyhedral elements. The base portions of the polyhedral elements may be opened or closed and are secured to the face sheet. This construction provides a structural panel that is lightweight, strong, inexpensive to manufacture and is resistant to bending and other stresses caused by an explosion or the like.

Each of the truncated polyhedral elements is filled with a suitable liquid such as water and has a hole therein that is closed by a burst disk, seal or the like. The polyhedral elements are constructed to collapse in the event of an explosion or the like, thereby causing the failure or removal of the burst disk or seal to open the holes therein and provide a misting action of the liquid therein.

In the event of an explosion in a room surrounded by the structural panel of the present invention, the base sheet is constructed to disintegrate or separate from the polyhedral elements so that the misting action of the liquid expelled from the collapsed elements envelopes the area surrounding the room with liquid vapor which absorbs heat and kinetic energy of the shock wave from the explosion and absorbs up to about ninety percent of the energy associated with the explosion.

DESCRIPTION OF THE PREFERRED EMBODIMENTS

Figure 1:
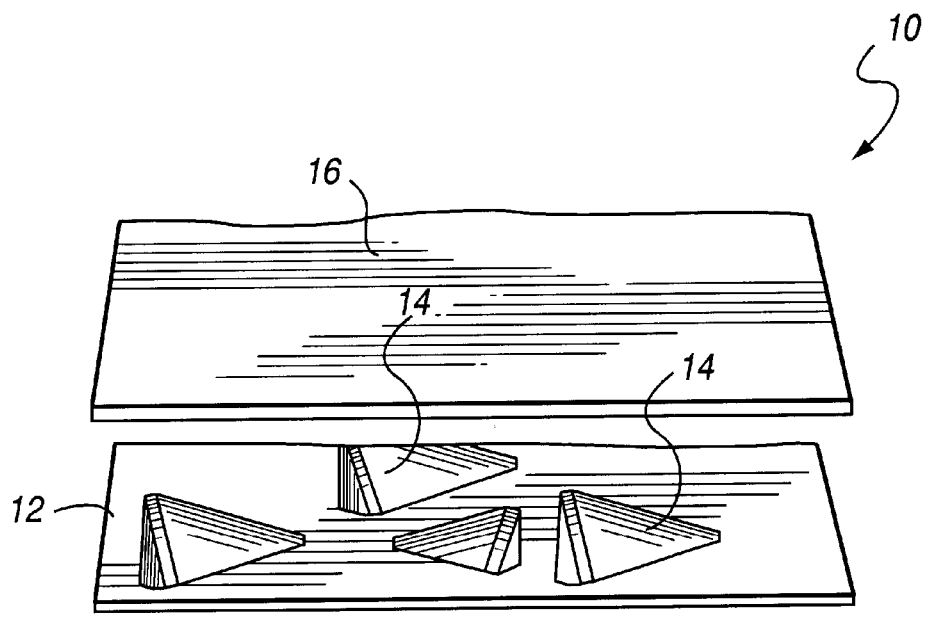
FIG. 1 is an exploded perspective view of one embodiment of a structural panel of the present invention.
Figure 2:
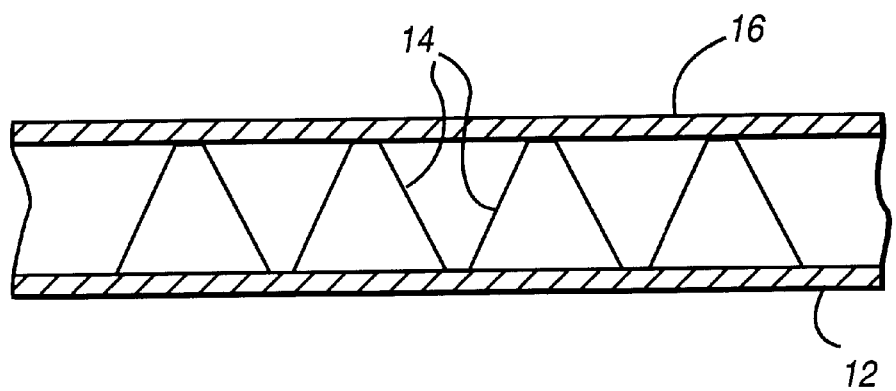
FIG. 2 is a side elevational view, partly in section, of the assembled structural panel shown in FIG. 1.
Figure 3:
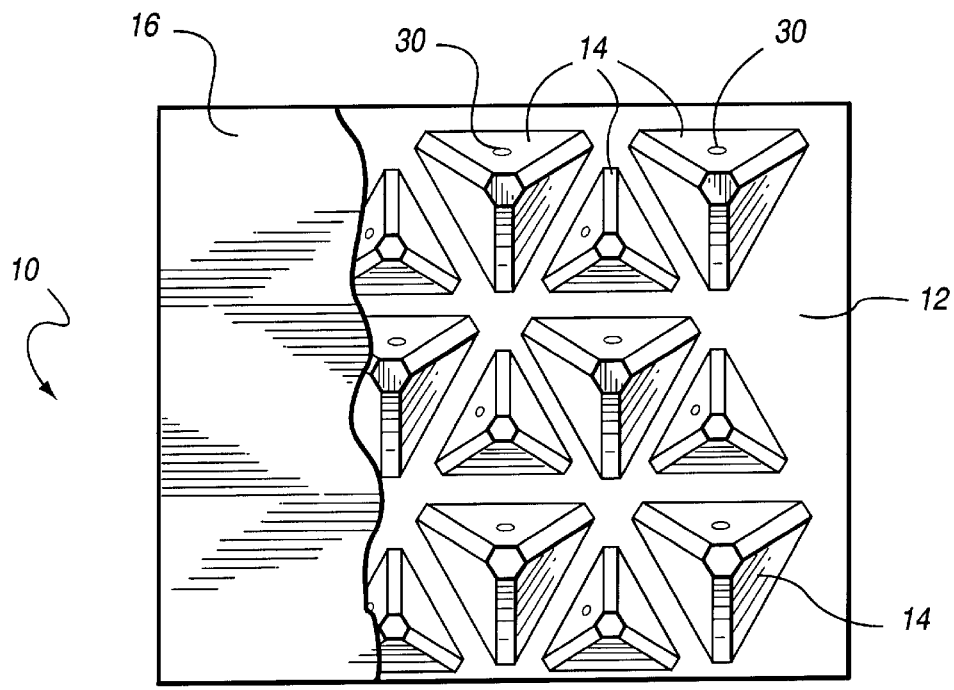
FIG. 3 is a top plan view of the structural panel shown in FIG. 2, with parts broken away.

As shown in FIGS. 1–3, the explosion barrier of the present invention comprises a structural panel 10 having a base sheet 12, a plurality of truncated polyhedral elements 14 secured to and extending upwardly from the base sheet 12, and a face sheet 16 covering and secured to the truncated apexes of the polyhedral elements 14. The base sheet, polyhedral elements and face sheet may be secured together in any suitable manner, such as by a suitable adhesive, and may be formed of any suitable lightweight, strong materials such as plastic, fiberglass, metal, paper or the like, as described in U.S. Pat. No. 4,348,442.

Figure 4:
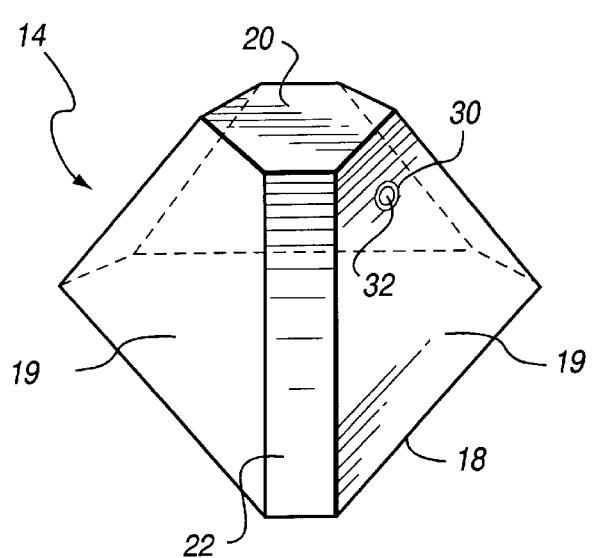
FIGS. 4–6 are perspective views of different types of polyhedral elements that could be used in the structural panel of the present invention.
Figure 5:
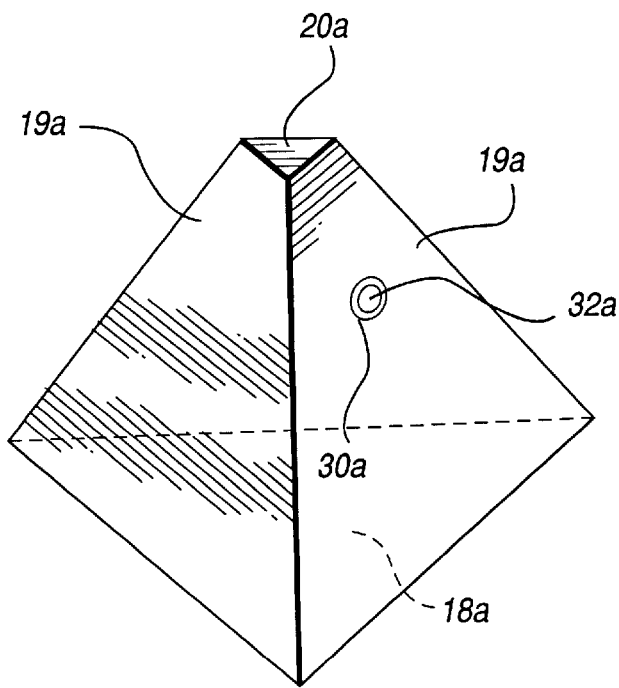
Figure 6:
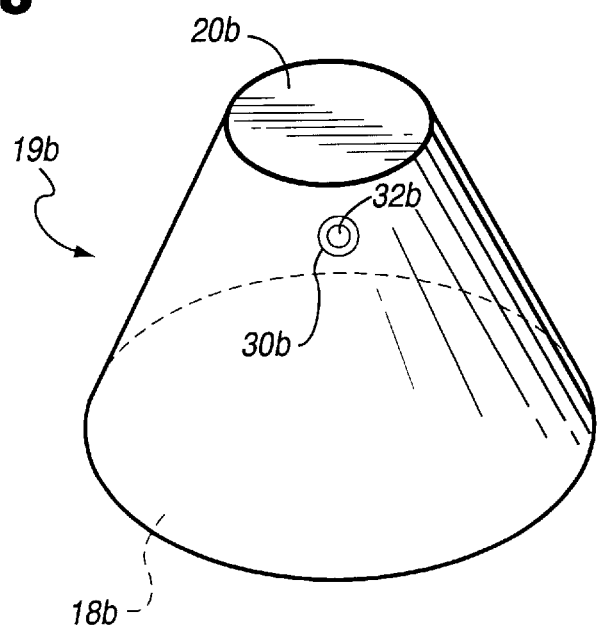

The polyhedral elements 14 may be in the form of a tetrahedron having faces 19, a base 18 (opened or closed), a truncated apex 20, and quasi-faces 22, as shown in FIGS. 3 and 4. Alternatively, the polyhedral elements may be in the form of a simple tetrahedron as shown in FIG. 5 having faces 19a, a base 18a (opened or closed) and a truncated apex 20a. FIG. 6 illustrates a further embodiment of the polyhedral element with a curved face 19b, a base 18b (opened or closed) and a truncated apex 20b.

The face sheet 16 is constructed to disintegrate or separate to expose the polyhedral elements 14 in the event of an explosion or the like. The polyhedral elements 14 are constructed to collapse when exposed to the shock wave from the explosion. Each of the polyhedral elements 14 is filled with a suitable liquid, such as water, for a purpose to be more fully described hereinafter.

As shown in FIGS. 3 and 4, each of the polyhedral elements 14 has a hole 30 therein which is closed by a burst disk 32 or other appropriate form of closure such as a removable seal that will be opened in the event of an explosion. The holes 30 are of a size to effect a misting action of the water or other liquid in the polyhedral element when it is collapsed when exposed to an explosion and the burst disk 32 is opened to force the liquid out of the opening 30. The alternate forms of the polyhedral elements 14 are provided with similar openings 30a. 30b and burst disks or other closures 32a, 32b as shown in FIGS. 5 and 6.

In the use of the explosion barrier of the present invention, the structural panel 10 is installed in surrounding relation to a room or other enclosure to be contained. If an explosion takes place in the room, the resulting blast shock wave disintegrates or removes the face sheet 16, collapses the polyhedral elements 14 and opens the holes 30 therein to force the liquid therein out of the holes in the form of a fine mist that will surround the room and absorb the heat and kinetic energy to effectively dissipate the explosion over-pressure which is the dominant cause of structural damage. Preferably, the holes 30 are located in the polyhedral elements 14 to produce a substantially uniform liquid mist. The liquid mist is effective to cause up to about a ninety percent reduction of the over-pressure energy from the explosion. In this manner, the effects of the explosion are contained in the room and damage or injury to the adjoining rooms or occupants thereof is minimized.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A barrier for containing an explosion in an enclosure such as a room, said barrier being a structural panel comprising:

a base sheet;

a plurality of truncated polyhedral elements secured to and projecting from said base sheet; and a face sheet covering and secured to the truncated apexes of said polyhedral elements, said face sheet being constructed to disintegrate or separate from said polyhedral elements to expose them when subjected to the pressure wave of an explosion;

each of said polyhedral elements being constructed to collapse when subjected to the pressure wave of an explosion, being filled with a liquid, and having an opening therein that is closed by a closure device that is openable or removable in response to the collapse of the polyhedral element caused by the explosion, said opening being of a size to effect a misting action of the liquid when it is ejected from said opening by the collapse of said polyhedral element;

whereby upon the occurrence of an explosion in the enclosure, the pressure wave thereof causes the removal of said face sheet and the collapse of said polyhedral elements which generates a liquid mist surrounding the enclosure to absorb and dissipate the heat and energy of the explosion.

2. The barrier of claim 1 wherein said liquid is water.

3. The barrier of claim 2 wherein said closure device is a burst disk.

4. The barrier of claim 1 wherein said polyhedral elements are tetrahedrons.

5. The barrier of claim 1 wherein said openings are positioned in said polyhedral elements to effect a substantially uniform liquid mist surrounding the enclosure in the event of an explosion.

6. The barrier of claim 1 wherein said face sheet is formed of a material that is weaker than that of said base sheet.

7. The barrier of claim 1 wherein said face sheet is formed of a material that is thinner than that of said base sheet.

* * * * *